United States Patent [19]

Kinoshita et al.

[11] Patent Number: 4,913,271
[45] Date of Patent: Apr. 3, 1990

[54] ONE-WAY CLUTCH

[75] Inventors: Yoshio Kinoshita, Ayase; Norio Komatsubara, Fujisawa, both of Japan

[73] Assignee: NSK Warner K.K., Tokyo, Japan

[21] Appl. No.: 254,816

[22] Filed: Oct. 7, 1988

[30] Foreign Application Priority Data

Oct. 13, 1987 [JP] Japan .................. 62-155543[U]

[51] Int. Cl.[4] ............................................. F16D 41/07
[52] U.S. Cl. .............................. 192/41 R; 192/107 R; 192/113 B
[58] Field of Search ............... 192/41 R, 41 A, 45.1, 192/113 B, 107 R, 70.17

[56] References Cited

U.S. PATENT DOCUMENTS

| | | | |
|---|---|---|---|
| 4,287,978 | 9/1981 | Staub, Jr. | 192/107 R |
| 4,396,100 | 8/1983 | Eltze | 192/113 B |
| 4,635,770 | 1/1987 | Shoji et al. | 192/41 A |
| 4,736,827 | 4/1988 | Kinoshita | 192/41 A |
| 4,792,028 | 12/1988 | Nishimura et al. | 192/41 R |

FOREIGN PATENT DOCUMENTS 63-28956 2/1988 Japan .

*Primary Examiner*—Rodney H. Bonck
*Assistant Examiner*—Andrea Pitts
*Attorney, Agent, or Firm*—Shapiro and Shapiro

[57] ABSTRACT

A one-way clutch comprises first and second rotational members radially spaced apart from each other and concentrically disposed for relative rotation and having axially extending annular track surfaces, a torque transmitting member disposed between the first and second rotational members for transmitting a torque between the track surfaces, a pair of retainers for retaining the torque transmitting member circumferentially, and a bearing member for holding the first and second rotational members concentric, the rear surface portion of the bearing member being formed with a recessed lubricating oil supply area for expediting the introduction of lubricating oil for lubricating the one-way clutch between the rear surface portion and a surface sliding relative thereto.

19 Claims, 4 Drawing Sheets

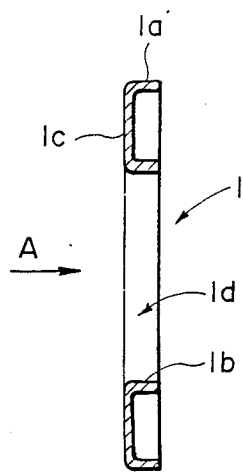
F I G. 1
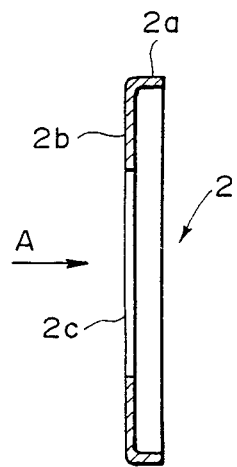
F I G. 2

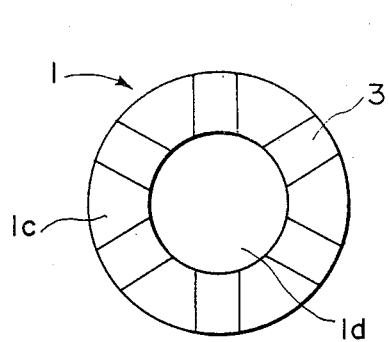
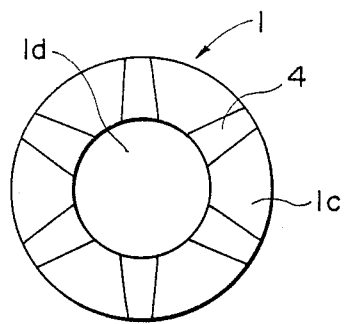
FIG. 3A    FIG. 3B
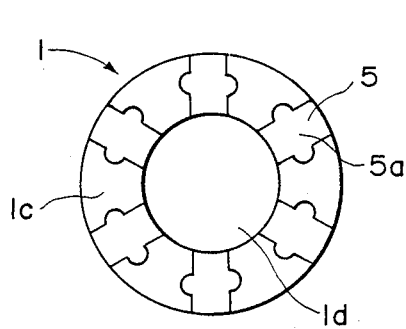
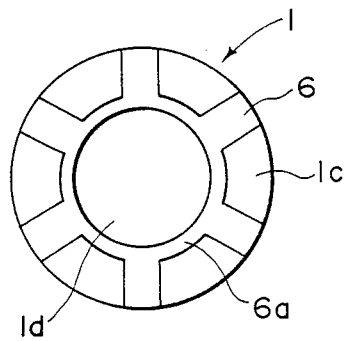
FIG. 3C    FIG. 3D
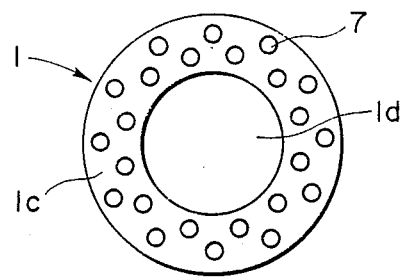
FIG. 3E

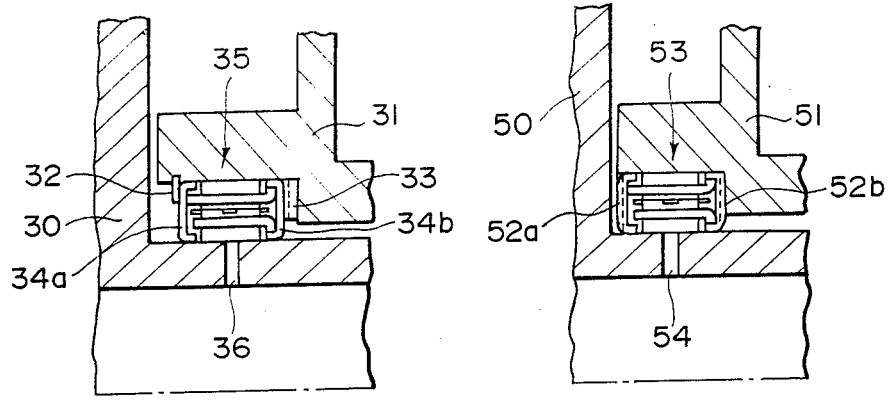
PRIOR ART
FIG. 6A
FIG. 7A
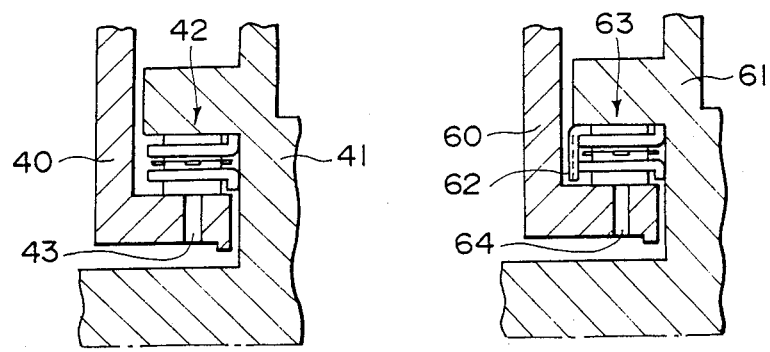
PRIOR ART
FIG. 6B
FIG. 7B

ONE-WAY CLUTCH

BACKGROUND OF THE INVENTION

1. Field of the Invention

This invention relates to a one-way clutch used as a part for torque transmission, back stop or the like, as for example, in the driving apparatus of an automotive vehicle, a printer or the like, and more particularly to improvements in an end bearing used in a sprag type or roller type one-way clutch.

2. Related Background Art

Lubricating oil which has lubricated a one-way clutch is discharged from the gaps between the inner and outer diameters of a bearing member, such as an end bearing or a side plate, for holding rotational members of the clutch concentric, and in the case of the end bearing, the inner and outer diameter sliding portions thereof are lubricated by the discharged lubricating oil to thereby prevent seizing or the like.

Further, with the end bearing amount of discharged lubricating oil is set to be smaller than the amount of lubricating oil entering the one-way clutch, whereby the interior of the one-way clutch is filled with lubricating oil thereby prevent the abrasion of the various portions of the one-way clutch.

Usually, the end bearing rotates while effecting substantially the same movement as the outer race, Therefore, prevention of the slipping-off of the end bearing is effected from the outer race side by a stop ring, a keep plate or the like, (slip off might occur, for example, due to the lubricating oil pressure created in the one-way clutch portion in the end bearing).

However, as the recent trend in the design of a one-way clutch, it is required to decrease the width of the stop ring or the keep plate, and perhaps even preferably to eliminate the stop ring or the keep plate in order to minimize the length of the product during the assembly of the one-way clutch. However, if such a construction is adopted in which the stop ring or the keep plate is eliminated, the rear surface portion of the end bearing and for example, the contact surface of an apparatus in which the one-way clutch is mounted rotate relative to each other and directly contact with each other. Accordingly, when the rear surface of the end bearing is urged against the relatively rotating surface by the lubricating oil pressure, there may be adverse effects such as seizing or bite in the rear surface portion of the end bearing and the surface rotating relative thereto and in sliding contact therewith. By such effects the function of the one-way clutch may be harmed and further, the entire driving apparatus in which the one-way clutch is incorporated may also be damaged or otherwise adversely affected.

SUMMARY OF THE INVENTION

It is therefore an object of the present invention to provide a one-way clutch in which the length of the product during the assembly of the one-way clutch can be decreased and in which seizing or bite can be prevented between the rear surface portion of a bearing member such as an end bearing and a surface which is in sliding contact therewith, whereby the life of the one-way clutch can be prolonged. It is also an object of the invention to provide a bearing member for such one-way clutch.

It is another object of the present invention to provide a one-way clutch comprising first and second rotational members radially spaced apart from each other and concentrically disposed for relative rotation and having axially extending annular track surfaces, a torque transmitting member disposed between said first and second rotational members for transmitting a torque between said track surfaces, a pair of retainers for retaining said torque transmitting member circumferentially, and a bearing member for concentric holding said first and second rotational members concentric, the rear portion of said bearing member being formed with a lubricating oil supply area for expediting the introduction of lubricating oil for lubricating said one-way clutch between said rear portion and a surface sliding relative thereto.

It is still another objecto of the present invention to provide, in a one-way clutch comprising first and second rotational members radially spaced apart from each other and concentrically disposed for relative rotation and having axially extending annular track surfaces, a torque transmitting member disposed between said first and second rotational members for transmitting a torque between said track surfaces, a pair of retainers for retaining said torque transmitting member circumferentially, and a bearing member for holding said first and second rotational members concentric, the bearing member being characterized in that the rear portion of said bearing member os formed with a lubricating oil supply area of expediting the introduction of lubrication oil for lubricating said one-way clutch between said rear portion and a surface sliding relative thereto.

With the above-described construction, in the end bearing of the present invention, lubricating oil can penetrate between the rear of the end bearing and a surface sliding relative thereto to thereby prevent seizing or the like.

BRIEF DESCRIPTION OF THE DRAWINGS

FIG. 1 is a radial cross-sectional view showing an end bearing according to an embodiment of the present invention.

FIG. 2 is a radial cross-sectional view showing a side plate according to an embodiment of the present invention.

FIG. 3A to 3E are rear views showing various emboodiments of a lubricating oil supply area in the rear portion of the end bearing.

FIGS. 6A and 6B are cross-sectional views showing conventional one-way clutches.

FIGS. 7A and 7B are cross-sectional views of one-way clutches in which the end bearing according to the present invention is incorporated.

DESCRIPTION OF THE PREFERRED EMBODIMENTS

Figure 4:
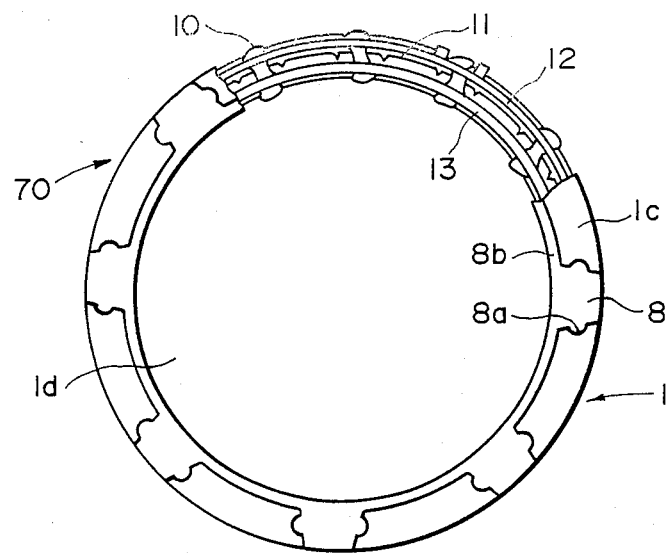
FIG. 4 is a partly broken-away rear view of a one-way clutch in which the end bearing according to the present invention is incorporated.

Some embodiments of the present invention will hereinafter be described in detail with reference to the accompanying drawings in which the like parts are designated by like reference characters.

FIGS. 1 and 2 are radial cross-sectional views showing two types of bearing of the present invention. The end bearinhg 1 of FIG. 1 comprises an annular outer flange portion 1a, and inner flange portion 1b and an annular rear connecting portion having a rear axial end surface 1c and connecting the outer and inner flange portions 1a and 1b together, and is usually unitarily formed of a plate material such as steel plate as by press shaping. The end bearing 1 is of a substantially annular shape as viewed in the direction of arrow A and is formed with a through portion 1d in the central portion thereof. FIG. 2 is a cross-sectional view showing a so-called side plate. The side plate 2 comprises an outer flange portion 2a and an annular rear portion connected thereto having a rear surface 2b and like the end bearing 1, is unitarily formed of a plate material or the like by press shaping. Thus, the side plate 2, when viewed in the direction of arrow A, is of a substantially disc-like shape and is formed with a through portion 2c at the center thereof.

As is apparent from the foregoing description, there is no difference between the end bearing and the side plate in their basic construction having a rear portion.

FIGS. 3A to 3E are rear view of the end bearing 1 as viewed in the direction of arrow A showing various embodiments of a lubricating oil supply area in the rear surface portion 1c, i.e., a lubricating oil groove or a lubricating oil reservoir.

The end bearing 1 shown in FIG. 3A has a predetermined width circumferentially in the rear surface portion 1c thereof, and is formed with a plurality of lubricating oil grooves 3 extending over the full radial width of the rear surface portion 1c. EAch lubricating oil groove 3 has a predetermined depth.

The end bearing shown in FIG. 3B is provided with a plurality of lubricating oil grooves 4 whose circumferential width increases in a tapering fashion from the outer diameter side toward the inner diameter side of the rear surface portion 1c, as compared with the lubricating oil grooves 3 in FIG. 3A. Although the lubricating oil grooves 4 are formed in a tapering fashion, these grooves may be of other shape if the inner diameter side width is made greater than the outer diameter side width. If a construction is adopted in which the circumferential width of the lubricating oil grooves 4 thus increases from the outer diameter side toward the inner diameter side, the rear surface of the end bearing can be made to float from the relatively rotating surface by the effect of a centrifugal force. Accordingly, the contact abrasion between the rear portion and the surface sliding relative thereto can be prevented more effectively. Each lubricating oil groove 4 has a predetermined depth.

In FIG. 3C, a plurality of lubricating oil grooves 5 similar to grooves 3 but having lubricating oil reservoirs 5a in their intermediate portions are provided in the rear surface portion 1c. Accordingly, in this case, lubricating oil suitably collects in the lubricating oil reservoir 5a, whereby lubrication of the sliding surface of the rear surface portion 1c is accomplished well. Each lubricating oil groove 5 has a predetermined depth.

In FIG. 3D, instead of the lubricating oil reservoirs 5a a shown in FIG. 3A, an annular lubricating oil reservoir 6a is provided in the inner diameter side edge portion of the rear surface portion 1c, and a plurality of lubricating oil grooves 6 communicating therewith is provided in the rear surface portion 1c. Again in this case, lubricating oil collects in the lubricating oil reservoir 6a, and therefore, lubrication of the sliding portion is accomplished better. The lubricating oil grooves 6 and the lubricating oil reservoir 6a have a predetermined depth.

In FIG. 3E, instead of the lubricating oil grooves shown in FIGS. 3A to 3D, a plurality of lubricating oil reservoirs 7 having a predetermined depth and formed as substantially circular recesses are provided in the rear surface portion 1c.

The supply of lubricating oil to the above-described lubricating oil supply area, i.e., the lubricating oil grooves or the lubricating oil reservoirs, in FIGS. 3A to 3E, is accomplished by the lubricating oil (after having lubricated the one-way clutch) passing through the through portion 1d and coming to the rear surface portion 1c from the inner diameter side of the end bearing 1. Of course, lubricating oil is supplied to the rear surface portion also from the gap at the outer diameter side of the end bearing. Accordingly, where for example, the tapered lubricating oil grooves 4 shown in FIG. 3B are provided, the entry, namely, introduction, of lubricating oil from the through portion 1d is expedited and the lubricating performance is more improved. Also, of course, the construction of FIG. 3B can be combined those of FIG. 3C or 3D. Further in some cases, the construction of FIG. 3E can be combined with of FIG. 3A or 3D, that is, the lubricating oil reservoirs 7 shown in FIG. 3E can be provided in the surface portion 1c between the lubricating oil grooves 3, 4, 5 and 6. In FIGS. 3A–3D, the lubricating oil grooves are provided circumferentially equidistantly, but these need not always be equidistant.

FIG. 4 is a rear view showing the bearing member of the present invention as it is actually used in a one-way clutch. The one-way clutch 70 is exemplarily shown as the sprag type, burt may be a one-way clutch of other types, for example, the roller type. The one-way clutch 70 is provided with outer and inner retainers 12 and 13 having a window for retaining a plurality of sprags 10, and further includes a ribbon spring 11 for imparting a rising moment to each sprag 10 of the clutch. The end bearing is disposed at an axial end of the clutch. The end bearing 1 has lubricating oil supply areas each comprising a tapered lubricating oil groove 8 enlarged from the outer diameter side to the inner diameter side and having a first lubricating oil reservoir 8a provided in the intermediate portion thereof. A second lubricating oil reservoir 8b is annularly provided in the inner diameter side edge portion of the end bearing. As already described, the lubricating oil groove 8 may be of other shape if the inner diameter side width thereof is made greater than the outer diameter side width. Lubricating oil after having lubricated the torque transmitting portion of the one-way clutch 70 passes through the central through portion 1d and the gap in the outer diameter portion, and goes round from the inner diameter side of the end bearing to the rear portion 1c to lubricate the surface sliding relative to the rear surface portion 1c.

Figure 5:
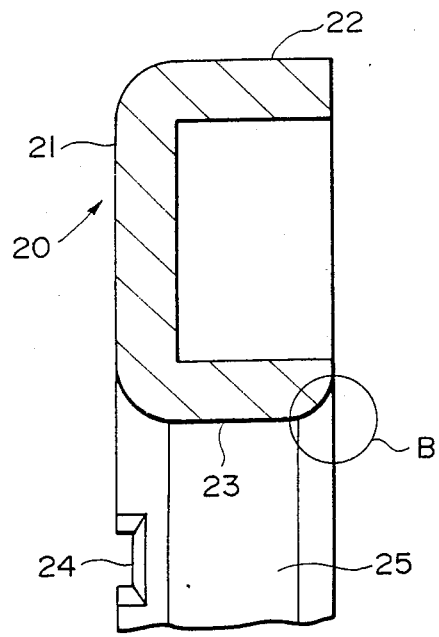
FIG. 5 is a cross-sectional view of an end bearing according to another embodiment of the present invention.

FIG. 5 is a radial cross-sectional view showing another embodiment of the end bearing. The end bearing 20 comprises an annular outer flange portion 22, an annular inner flange portion 23 and an annular rear connecting portion having a rear surface 21 and connecting the two flange portions together. A lubricating oil grooves 24 extending from the outer diameter side to the inner diameter side of the end bearing 20 is formed in the rear surface portion 21. The side of the inner flange portion 23 which is axially opposite to the rear surface portion 21, i.e., the corner of the inner flange portion 23 as seen in the cross-sectional of the annular edge axially toward the one-way clutch, is a portion B rounded so as to have a predetermined curvature and therefore, it is easy to introduce the lubricating oil from the one-way clutch to the inner diameter side of the lubricating oil groove 24 through the portion B and a through portion 25. The end bearing 20 of the construction shown in FIG. 5 can be made by press-stamping a plate material, and may be of a dull shape.

FIGS. 6A and 6B are cross-sectional views showing one-way clutches of conventional construction, and FIGS. 7A and 7B are cross-sectional views showing one-way clutches incorporating a bearing according to the invention.

In FIG. 6A, a sprag type one-way clutch 35 is in contact with the respective track surfaces of an inner race 30 and an outer race 31 and transmits a torque therebetween. A lubricating oil supply port 36 lubricating the one-way clutch 35 is provided in the inner race. Also, end bearings 34a and 34b are used adjacent one-way clutch 35, and in the end bearing 34a, a stop ring 32 is fixedly provided in the stop ring groove of the outer surface 31 to prevent the end bearing from falling off. Further, adjacent the end bearing 34b, a spacer 33 is provided to avodi the direct contact of the outer race 31 with the sliding rear surface. In contrast, the one-way clutch 53 shown in FIG. 7A is only disposed between an inner race 50 and an outer race 51 with end bearings 52a and 52b, and has no stop ring or spacer. Lubricating oil supplied from a lubricating oil port 54 provided in the inner race lubricates the one-way clutch 53, whereafter it is introduced into the rear portion of each end bearing from the gap between the inner diameter side and the outer diameter side of the rear portion of the end bearing. Thus, it can be well seen from the drawing that as compared with the conventional one-way clutch, the one-way clutch of the present invention is small in its axial length.

In FIG. 6B, a one-way clutch 42 is disposed between an inner race 40 having a lubricating oil port 43 and an outer race 41, without any end bearing. As seen from this figure, the axial length is quite limited. Consequently, no bearing could heretofore been used, because of the lack of the space for using a stop ring or a spacer. In contrast, in the one-way clutch shown in FIG. 7B, the one-way clutch 63 is disposed between an inner race 60 having a lubricating oil port 64 and an outer race 61. A bearing (side plate) 62 according to the presentr invention is disposed at one axial end of the one-way clutch 63, thus, in the absence of a stop ring, the bearing of the invention can be used, so that the life of the one-way clutch is prolonged.

With the above-described bearing and one-way clutch of the present invention, there are obtained the following effects.

Even if the sliding surface rotating relative to the rear surface portion of the bearing member slidingly contacts with said rear surface portion, damage such as abrasion and seizing of the rear portion can be prevented because a lubricating oil supply area is provided in the rear portion.

The bearing member can be used even at a location having no space for a stop ring ot like, and therefore, the one-way clutch can be filled with lubricating oil with a result that the life of the one-way clutch is improved.

The space, particularly, the axial dimensions can be shortened and parts such as a stop ring, etc. can be eliminated. Therefore, for example, the working of a stop ring groove becomes unnecessary with a result that the manufacturing cost of the entire one-way clutch can be reduced.

We claim:

1. A one-way clutch comprising:
   first and second rotational members radially spaced aprat from each other and concentrically disposed for relative rotation and having axially extending annular track surfaces;
   a torque transmitting member disposed between said first and second rotational members for transmitting a torque between said track surfaces;
   a pair of retainers for retaining said torque transmitting member in a circumferential direction of said track surfaces; and
   a substantially annular bearing member holding said first and second rotational members concentric, an axial end surface portion of said bearing member facing away from said torque transmitting member being formed with recessed lubricating oil supply area means for receiving lubricating oil supplied to said one-way clutch and thereby facilitating lubrication of said end surface portion.

2. A one-way clutch according to claim 1, wherein said lubricating oil supply area means comprises a plurality of grooves extending radially of said bearing member with predetermined width from an outer diameter side edge of said end surface portion to an inner diameter side edge thereof.

3. A one-way clutch according to claim 2, wherein said lubricating oil supply area means has a lubricating oil reservoir between said outer diameter side edge and said inner diameter side edge.

4. A one-way clutch according to claim 3, wherein said grooves are wider at the inner diameter sides thereof than at the outer diameter sides thereof.

5. A one-way clutch according to claim 2, wherein said grooves are wider at the inner diameter sides thereof than at the outer diameter. sides thereof.

6. A one-way clutch according to claim 1, wherein said lubricating oil supply area means comprises a substantially annular lubricating oil reservoir at an inner diameter side edge of said end surface portion and a plurality of grooves extending radially of said bearing member with predetermined width from an outer diameter side edge of said end surface portion to said oil reservoir.

7. A one-way clutch according to claim 6, wherein said grooves are wider at the inner diameter sides thereof than at the outer diameter sides thereof.

8. In one-way clutch comprising first and second rotational members radially spaced apart from each other and concentrically disposed for relative rotation and having axially extending annular track surfaces, a torque transmitting member disposed between said first and second rotational members for transmitting a torque between said track surfaces, and a pair of retainers for retaining said torque transmitting member in a circumferential direction of said track surfaces,
   a substantially annular bearing member holding said first and second rotational members concentric and having an axial end surface portion facing away from said torque transmitting member and formed with recessed lubricating oil supply area means for receiving lubricating oil supplied to said one-way clutch and thereby facilitating lubrication of said end surface portion.

9. A bearing member according to claim 8, wherein said lubricating oil supply area means comprises a plurality of grooves extending radially of said bearing member with predetermined width from an outer diameter side edge of said end surface portion to an inner diameter side edge thereof.

10. A bearing member according to claim 9, wherein said lubricating oil supply area means has a lubricating oil reservoir between said outer side edge and said inner side edge thereof.

11. A bearing member according to claim 10, wherein said grooves are wider at the inner diameter sides thereof than at the outer diameter sides thereof.

12. A bearing member according to claim 9, wherein said grooves are wider at the inner diameter sides thereof than at the outer diameter sides thereof.

13. A bearing member according to claim 8, wherein said lubricating oil supply area means comprises a substantially annular lubricating oil reservoir at an inner diameter side edge of said end surface portion and a plurality of grooves extending radially of said bearing member with predetermined width from an outer diameter side edge of said end surface portion to said oil reservoir.

14. A bearing member according to claim 13, wherein said grooves are wider at the inner diameter sides thereof than at the outer diameter sides thereof.

15. In a one-way clutch comprising first and second rotational members radially spaced apart from each other and concentrically disposed about an axis for relative rotation and having axially extending annular track surfaces, a torque transmitting member disposed between said first and second rotational members for transmitting a torque between said track surfaces, and a pair of retainers for retaining said torque transmitting member in a circumferential direction of said track surfaces, a substantially annular bearing member disposed concentrically between said first and second rotational members and holding said first and second rotational members concentric, said bearing member having a portion disposed between said retainers and a substantially radial surface of said one-way clutch that is rotatably slidable relative to a facing surface of said portion of said bearing member, said facing surface being formed with recessed lubricating oil supply area means for receiving lubricating oil supplied to an interior region of said one-way clutch and thereby enhamcing lubrication between said substantially radial surface of said one-way clutch and said facinf surface of said portion of said bearing member.

16. A bearing member according to claim 15, wherein said lubricating oil supply are means comprises a plurality of grooves extending radially inwardly from an outer diameter side edge of said facing surface.

17. A bearing member according to claim 16, wherein each of said grooves diverges in a radial inward direction of said bearing member.

18. A bearing member according to claim 16, wherein said lubricating oil supply area means further includes a substantially annular lubricating oil reservoir at an inner diameter side edge of said facing surface and in communication with said grooves.

19. A bearing member according to claim 18, wherein each of said grooves diverges in a radial inward direction of said bearing member.

* * * * *